United States Patent
Castanyer Collell

(10) Patent No.: US 7,935,747 B2
(45) Date of Patent: May 3, 2011

(54) PIGMENT PREPARATION FOR COLORING POLYMERS

(75) Inventor: Josep Castanyer Collell, Masies de Roda (ES)

(73) Assignee: IQAP Masterbatch Group, S.L., Masies de Roda (ES)

(*) Notice: Subject to any disclaimer, the term of this patent is extended or adjusted under 35 U.S.C. 154(b) by 569 days.

(21) Appl. No.: 11/587,977

(22) PCT Filed: Jun. 21, 2005

(86) PCT No.: PCT/ES2005/000347
§ 371 (c)(1),
(2), (4) Date: Oct. 30, 2006

(87) PCT Pub. No.: WO2006/021598
PCT Pub. Date: Mar. 2, 2006

(65) Prior Publication Data
US 2008/0058463 A1    Mar. 6, 2008

(30) Foreign Application Priority Data
Jul. 27, 2004  (ES) .................. 200401852

(51) Int. Cl.
*C08J 3/22*    (2006.01)
(52) U.S. Cl. ........ 523/351; 524/500; 524/504; 524/515; 524/556
(58) Field of Classification Search .............. 523/351; 524/500, 504, 515, 556
See application file for complete search history.

(56) References Cited

U.S. PATENT DOCUMENTS

| | | | |
|---|---|---|---|
| 3,846,360 A | 11/1974 | Needham | |
| 4,656,206 A | 4/1987 | Carter | |
| 5,872,164 A * | 2/1999 | Koide et al. | 523/339 |

FOREIGN PATENT DOCUMENTS

| | | | |
|---|---|---|---|
| EP | 277598 | | 8/1988 |
| EP | 277598 A | * | 8/1988 |
| JP | 54129050 | | 10/1979 |
| JP | 54129050 A | * | 10/1979 |
| JP | 63008458 | | 1/1988 |
| JP | 63008458 A | * | 1/1988 |
| JP | 5202234 | | 8/1993 |
| JP | 05202234 A | * | 8/1993 |
| JP | 9031206 | | 2/1997 |
| JP | 09031206 A | * | 2/1997 |

OTHER PUBLICATIONS

JP 09-031206, Machida et al., Feb. 2, 1997, Machine translation.*
Hausmann, K. et al. "Additives with Dual Function—Acrylate Ester Copolymers as Modifiers for Engineering Polymers and as Carrier Resin for Masterbatches." *Polymers & Polymer Composites.* vol. 11, No. 2, pp. 91-100. 2003.

* cited by examiner

Primary Examiner — Satya B Sastri
(74) *Attorney, Agent, or Firm* — Dowell & Dowell, PC

(57) ABSTRACT

The invention relates to a pigment preparation for coloring polymers. The inventive preparation comprises one or more pigments and a carrier. According to the invention, the carrier includes an oligomer or a combination of low-molecular-weight polymers from the group containing polymers and copolymers of ethylene-acrylic acid, ethylene-maleic anhydride or polypropylene-maleic anhydride. The carrier also includes a polymer from the group containing polymers of ethylene-ethyl acrylate, ethylene/butyl acrylate, ethylene/methacrylic acid, polypropylene with grafted methyl polymethacrylate, polypropylene with grafted polystyrene or block copolymers of styrene. For organic pigments, the preparation contains 50%-70% pigment and 50%-30% carrier. For inorganic pigments, the preparation contains 60%-90% pigment and 40%-10% carrier. The invention comprises a polyvalent pigment preparation which can be used in the production of color concentrates with specific bases and high precision.

4 Claims, No Drawings

PIGMENT PREPARATION FOR COLORING POLYMERS

BACKGROUND OF THE INVENTION

1. Field of the Invention

This invention refers to a pigment preparation used as an intermediary product for dying polymers, the advantages of which has numerous benefits, as detailed in this report.

The invention belongs to the technical area of plastics, in particular dying polymers.

2. Brief Description of the Related Art

Colour concentrates are normally used to dye polymers, called "masterbatch" in the technique. The advantages of using colour concentrates, with regard to other systems, such as dry dying, are described below.

The process of polymer dry dying is carried out by simply physically mixing pigments with the polymer. The pigment powder particles have a strong tendency to group together and to form strongly cohesive clumps. These are difficult to separate using a transformation process. In consequence it is normal that the dyed material has spots and colour stains. This process cannot be used on thin materials (film, raffia, fibre, laminate . . . ) or where how the material looks is critical.

In the case of colour concentrates, there are pigment dispersions in the form of very fine particles which are included into a plastic medium similar to the resin to be dyed or a medium which is compatible to the same. Highly uniform and high-quality dyes are obtained due to the optimum dispersion of the pigment.

Typical colour concentrates are in the form of granules and the conventional concentration is between 5-30% for organic pigments and 15-60% for inorganic pigments. Usage dosage is between 2-4% depending on the transformation system for the resin to be dyed as well as the thickness of the final article. In general, colour concentrates are used in processes which require a prior mixture of the material to be dyed in a spindle such as during the injection, extrusion, extrusion-blowing etc moulding processes.

Color concentrate production can be carried out using different methods:

1—From a powder pigment: production is in two stages. During the first phase the pigments, spreaders, lubricants, stabilisers and other additives are mixed with the resin, usually in turbo mixers or by using a gravimetric analysis. During the second stage the finished product is obtained by excluding the pre-mixture using a twin spindle co-rotating extruder.

2—Using single colour concentrates: in this case single pigment colour concentrates are obtained using the method described in the above section during the first phase. The final colour concentrate is obtained by extruding the physical mixture with the support polymer (normally using a single spindle extruder). The pigment concentration of the single colours is usually between 15-40% for organic pigments and between 40-70% for inorganic pigments. These single colour concentrates are compatible with a very limited family of polymers.

3—Using pigment preparations: the pigment preparations have an optimum dispersion of a pigment in an organic medium. The concentration is typically 40-50% for organic pigments and 50-80% for inorganic pigments. The drawback for single colour concentrates is that they have a limited compatibility. In practice, the use of pigment preparations is limited to polyolefinic polymers, some elastomers and with restrictions in polyamide. The final colour concentrate is usually obtained by extruding a physical mixture of the pigment preparations and the support polymer in a co-rotating dual spindle extruder. As opposed to single colour concentrates, pigment preparations are physically micro-granules which are obtained from the pigments in the form of a pressed filter aqueous paste. This paste is placed in a vacuum mixer. Small amounts of special additives are added to quickly remove water and moisture from the pigment particles by using the organic substrate (oils, waxes, plasticisers, polymers, etc).

If there are universal colour concentrates, which are theoretically compatible with all polymers, their use in practice is restricted to the type of application.

For dying critical articles or during critical applications, the use of specific colour concentrates is required together with the same or chemically very similar support as the resin to be coloured.

It is necessary to find the optimum combination of spreaders, stabilisers, lubricants, etc for each support during the manufacture of colour concentrates with specific bases. This means that the manufacturer of colour concentrates or dying compounds (particularly for technical polymers) must use many formulas and manufacturing processes.

It would be much easier if there were multipurpose pigment preparations which could be used to manufacture colour concentrates with specific and highly accurate bases.

DESCRIPTION OF THE PREFERRED EMBODIMENT

The invention proposes multipurpose pigment preparations which, when mixed with any polymer resin and by using an extrusion process (twin spindle co-rotating extruder), allows colour concentrates with specific bases to be obtained.

The pigment preparations in this invention are obtained using a two-stage process: premixing and simple extrusion resulting in 3 mm granules or preferably micro-granules with a diameter of less than 1.2 mm.

More specifically, the single pigment colour concentrates in the invention have the following chemical composition:

Organic Pigments:
50-70% pigment
50-30% carrier
Inorganic Pigments:
60-90% pigment
40-10% carrier The carrier has a first component selected from the following group:
polymers or copolymers of ethylene acrylic acid;
polymers or copolymers of ethylene maleic anhydride;
Polypropylene maleic anhydride;
Polycaprolactone; and
mixtures or combinations thereof.

The carrier also includes preferably one or more of the following polymers:
Polymers of ethylene acrylic acid;
Polymers of ethylene butyl acrylate;
Polymers of ethylene methacrylic acid;
Polypropylene grafted with polymethyl methacrylate (PMMA-grafted PP);
Polypropylene with grafted polystyrene (PS-grafted PP);
Block copolymers of styrene; and
mixtures and combinations thereof.

The use of the aforementioned pigment preparations considerably simplifies the colour concentrate production process. In order to obtain the pigment preparations just the physical mixing of different pigments with the base polymer is required followed by processing in a twin spindle co-rotating extruder. The premixing process in a turbo mixer is not required using this process and therefore the complexity of studying and selecting from a recipe of spreaders, stabilisers, lubricants, etc for each polymer is avoided.

By using the invention, it is also possible to simplify the colour equaling process. Premixing pigments, additives, etc is also not required during the production process and the development process of a new colour. In this way, the colour duplication process is simpler and quicker.

Another advantage of the invention is that the same intermediate products are used, due to the preparation phase in the laboratory and the production phase in the factory. The change of scale between laboratory and reduction is thereby avoided.

The high concentration of pigments in the invention allows costs to be reduced and flexibility in simplifying the production process to be increased. Also the product in the invention is a multipurpose product meaning that it can be used for all polymers (LDPE, LLDPE, HDPE, PP—homo and copolymer—, PVC—rigid and plasticised—, PS, ABS, ASA, SAN, CAB, PA, PC, PET, PBT, etc).

In this way, the carrier is also multipurpose and is compatible with the majority of commercial polymers with the ability to be mixed with itself or with any other polymer in any proportion with a carrier in order to obtain a highly accurate, specific colour concentrate.

Having sufficiently described how this invention, it is easy understood that any modification to the detail of the mention which is judged to be suitable may be made whenever the essential features of the summarised invention in the following claims are not altered.

The invention claimed is:

1. A pigment preparation for dyeing polymers, consisting of:
   at least one pigment and a carrier, the carrier consisting of:
   a first component selected from the group consisting of ethylene-acrylic acid copolymer, ethylene-maleic anhydride copolymer, and polycaprolactone polymer; and
   a second component selected from the group consisting of ethylene-ethyl acrylate copolymer, ethylene-butyl acrylate copolymer, ethylene-methacrylic acid copolymer, Polypropylene grafted with polymethyl methacrylate copolymer, polypropylene with grafted polystyrene copolymer and block copolymers of styrene;
   wherein the pigment preparation is a chemical composition of between 50% and 90% of the pigment and between 10% and 50% of the carrier.

2. The pigment preparation according to claim 1, wherein the pigment is an organic pigment, and the pigment preparation is a chemical composition of between 50% and 70% of the pigment and between 50% and 30% of the carrier.

3. The pigment preparation according to claim 1, wherein the pigment is an inorganic compound, and the pigment preparation is a chemical composition of between 60% and 90% of the pigment and between 40% and 10% of the carrier.

4. The pigment preparation according to claim 1, wherein the pigment is selected from the group consisting of organic pigments, inorganic pigments and any combination thereof, and the pigment preparation is a chemical composition of between 50% and 90% of the pigment and between 50% and 10% of the carrier.

* * * * *